Figure 1:
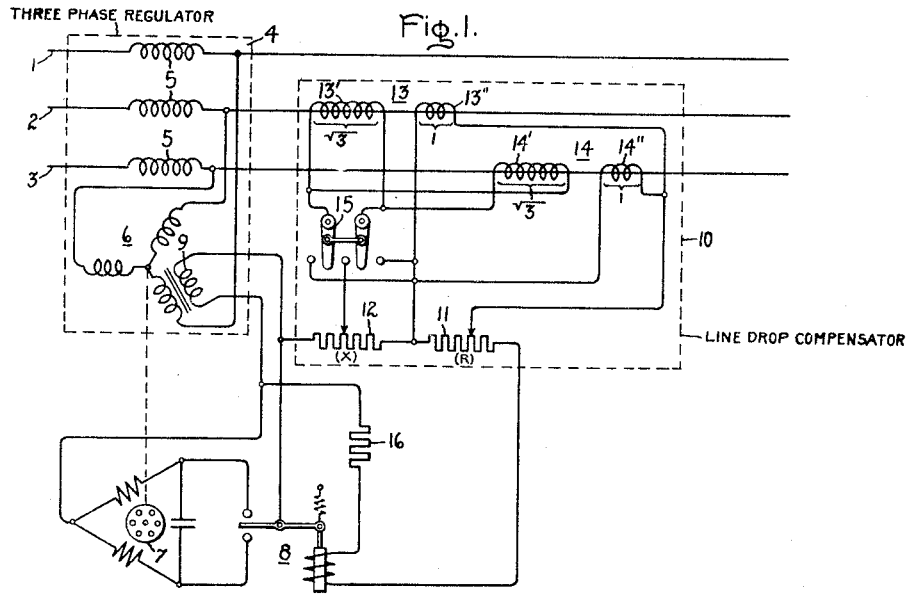

Inventors:
Thomas C. Lennox,
Salvatore Minneci,
by Harry E. Dunham
Their Attorney.

June 11, 1940.    T. C. LENNOX ET AL    2,204,418
LINE DROP COMPENSATOR
Filed Sept. 26, 1939    2 Sheets-Sheet 2
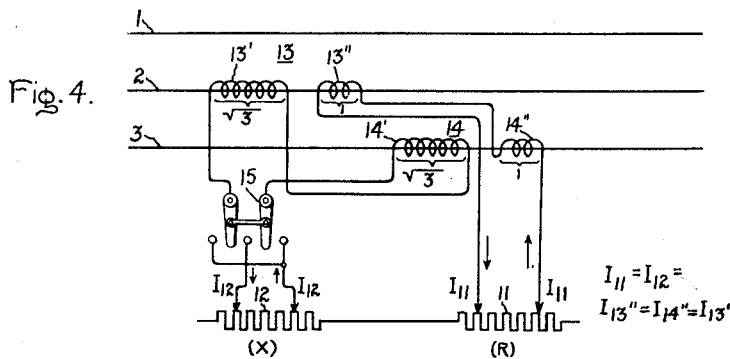
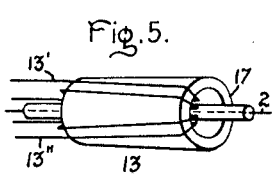
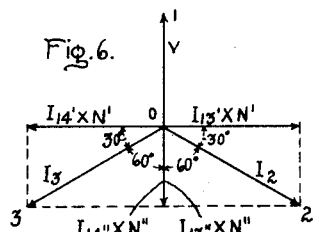
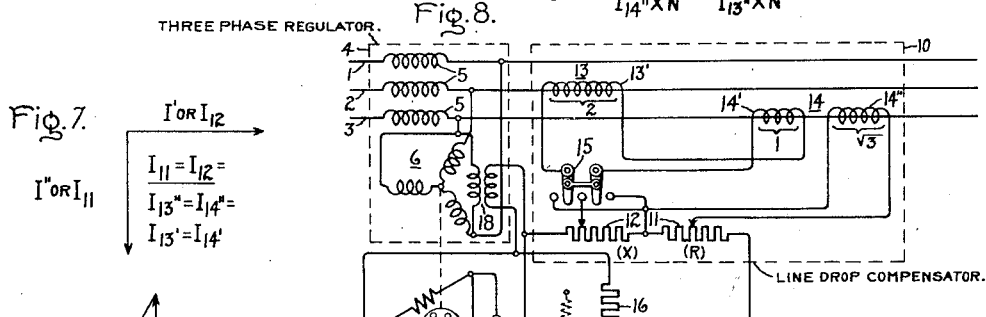
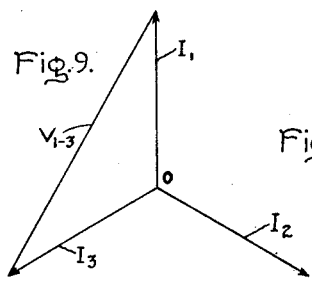
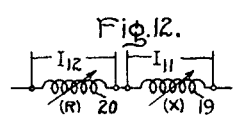
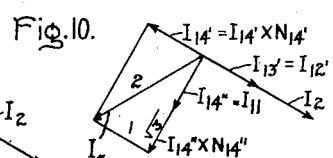
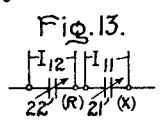
Inventors:
Thomas C. Lennox,
Salvatore Minneci,
by Harry E. Dunham
Their Attorney.

Patented June 11, 1940

2,204,418

UNITED STATES PATENT OFFICE 2,204,418

LINE DROP COMPENSATOR

Thomas C. Lennox and Salvatore Minneci, Pittsfield, Mass., assignors to General Electric Company, a corporation of New York Application September 26, 1939, Serial No. 296,602

12 Claims. (Cl. 171—119)

This invention relates to line drop compensators and more particularly to improvements in line drop compensators for use with automatically-controlled transformer-type voltage regulators for three-phase alternating current power circuits.

This application is a continuation in part of application Serial No. 251,790, filed January 19, 1939, and assigned to the assignee of the present application.

The line drop compensator is of the so-called resistance and reactance type in that the amount of resistance and reactance compensation produced by the compensator may be adjusted separately.

In accordance with one embodiment of the invention the resistance compensation is produced by passing through an impedance a current derived from the three-phase power circuit which is in phase or in phase opposition with the voltage to neutral of one of the main conductors of the circuit and the reactance compensation is produced by passing through another impedance a current derived from the main power circuit which is in quadrature with the voltage to neutral of the above referred to main conductor.

In accordance with another embodiment of the invention the resistance compensation is produced by passing through an impedance a current derived from the three-phase power circuit which is in phase or in phase opposition with one of the line to line voltages of the circuit and the reactance compensation is produced by passing through another impedance a current derived from the main power circuit which is in quadrature with the line to line voltage referred to above.

While the invention is particularly well adapted for use with three-phase voltage regulators, in which connections to all three of the main conductors of a three-phase power circuit are necessary, the invention may also be used with single phase regulators which are connected open-delta or in any other suitable way to regulate the voltage of a three-phase circuit.

An object of the invention is to provide a new and improved line drop compensator.

Another object of the invention is to provide a new and improved line drop compensator for three-phase feeder circuit voltage regulators.

The invention will be better understood by reference to the following description taken in connection with the accompanying drawings and its scope will be pointed out in the appended claims.

Figure 2:
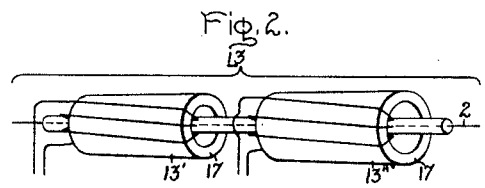
Figure 3:
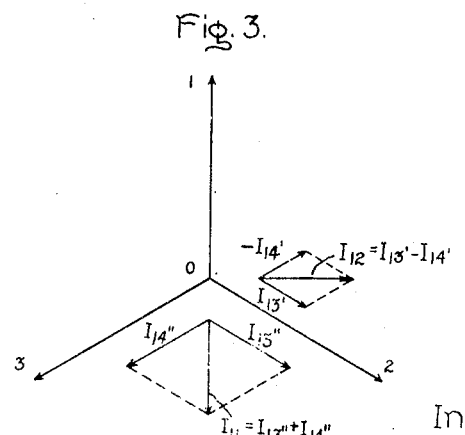

In the drawings Fig. 1 illustrates diagrammatically an embodiment of the invention, Fig. 2 illustrates the type of current transformer used in Fig. 1, Fig. 3 is a vector diagram for explaining the principle of operation of Fig. 1, Fig. 4 illustrates a modified way of obtaining the in-phase and quadrature currents, Fig. 5 illustrates the type of current transformer required for Fig. 4, Figs. 6 and 7 are vector diagrams for explaining the operation of Fig. 4, Fig. 8 illustrates diagrammatically another embodiment of the invention, Figs. 9, 10 and 11 are vector diagrams for explaining the operation of Fig. 8, Fig. 12 is a modification using reactors through which the quadrature and in-phase currents are circulated so as to produce the resistance and reactance compensation voltages respectively, and Fig. 13 is similar to Fig. 12 but uses capacitors instead of reactors.

Referring now to the drawings and more particularly to Fig. 1, there is shown therein a main three-phase alternating current power circuit having conductors 1, 2 and 3. Connected in this circuit is a three-phase voltage regulator 4 which is shown by way of example as an induction voltage regulator having series windings 5 connected respectively in the conductors of the main circuit and having a star-connected primary winding 6. Variation in the regulating voltage produced by the series windings 5 is produced by rotating the exciting primary winding 6 relative thereto by means of a reversible motor 7. The direction of operation of the motor 7 is controlled by a voltage regulating relay 8 energized in proportion to the voltage to neutral of the conductor 1 by means of a tertiary winding 9 on the regulator. The operating current for motor 7 may also conveniently be obtained from the tertiary winding 9.

The arrangement is such that if the energizing voltage of the relay 8 departs from a predetermined normal value in either direction, one or the other of the sets of contacts of the relay 8 will close, thereby causing the motor 7 to drive the regulator 4 in the proper direction to restore the voltage to normal. When normal voltage is re-established, the relay 8 opens its contacts and the motor comes to rest.

The line drop compensator is shown at 10. Its purpose is to insert in the energizing circuit of the regulating relay 8 voltages proportional respectively to the resistance and reactance voltage drops in the main circuit between the regulator and a predetermined point on the main circuit. In this manner the actual voltage applied to the relay 8 will correspond to the voltage at the predetermined point on the power circuit and consequently the regulating system will act to hold the voltage constant at this point.

The compensator comprises resistors 11 and 12 connected in series with the relay 8 and current transformers 13 and 14 connected in the main conductors 2 and 3. The resistors are preferably, although not necessarily, identical and the current transformers 13 and 14 are also preferably, although not necessarily, identical. Each current transformer is provided with a pair of secondary windings designated respectively by primed and double primed reference numerals whose turns are in the ratio of $$\sqrt{3}:1$$

The unity secondary windings 13" and 14" are connected in parallel with the same polarity across adjustable portions of the resistor 11 and the $$\sqrt{3}$$

valued secondary windings 13' and 14' are connected in parallel, with the secondary winding 14' reversed, across adjustable portions of the resistor 12. A reversing switch 15 is provided for reversing the polarity of the resultant current output of the $$\sqrt{3}$$

valued secondary windings as applied to the resistor 12.

The current transformers 13 and 14 are preferably so-called double secondary current transformers. Such transformers are, in effect, two separate current transformers with their primary windings in series, that is to say, each secondary winding has its own iron core, although they usually use the same insulation between the primary bar or conductor and their respective cores. An example of such an arrangement for transformer 13 is shown in Fig. 2.

A conventional ballast resistor 16 is connected in the energizing circuit of the relay 8.

The operation of the line drop compensator can best be understood from Fig. 3. In this figure the three vectors 0–1, 0–2 and 0–3 represent the voltages to neutral of the three main conductors 1, 2 and 3 and also represent the currents in the conductors 1, 2 and 3 at unity power factor on the main circuit. Current $I_{11}$ is shown as the vector sum of two equal currents which are in phase respectively with the currents in the main conductors 2 and 3. These two currents are produced by the secondary windings $I_{13''}$ and $I_{14''}$. The current $I_{11}$ in flowing through the resistance 11 produces a resistance voltage drop which by proper adjustment of the resistance 11 can be made proportional to the resistance voltage drop in conductor 1 of the main line.

The current $I_{12}$ is the resultant of two equal components, $I_{13'}$ and $-I_{14'}$ derived respectively from the secondary winding 13' and the reversed secondary winding 14'. The current $I_{12}$ is at right angles to the vector 0–1 and thus the voltage drop produced by this current in flowing through the resistance 12 will be in phase with the reactance voltage drop in conductor 1 of the main circuit.

The currents $I_{11}$ and $I_{12}$ are numerically equal by reason of the different number of turns in the primed and double primed secondary windings combined with the difference in the angle between the currents in the primed and double primed secondary windings during their respective vector additions.

By adjusting the amount of the resistance 12 through which the current $I_{12}$ is passed, the magnitude of the reactance compensation may readily be adjusted.

In Fig. 4 the in-phase and quadrature currents $I_{11}$ and $I_{12}$ are produced by a different principle. This principle is characterized by a series connection of the secondary windings instead of a parallel connection as in Fig. 1, and is further characterized by having the secondary windings of each current transformer wound on the same iron core instead of on separate iron cores. This latter feature is illustrated in Fig. 5 and results in a more compact and less expensive construction because the placing of the secondary windings 13' and 13" on separate iron cores 17 not only requires a greater lengthwise space on the conductor 2 but also requires substantially double the amount of iron than is required when both windings 13' and 13" are wound on the same core 17. As the windings 13' and 13" are usually wound on their cores by winding machines it is much easier to wind two separate coils on the same core than it is to wind one coil on one core, then remove that core from the machine and wind another coil on the other core.

Returning now to Fig. 4, the $$\sqrt{3}$$

valued or primed windings 13' and 14' are connected in series across the resistor 12 with the polarity of winding 14' reversed, while the unity valued or double primed windings 13" and 14" are connected in series with the same polarity across the resistor 11.

The operation of Fig. 4 is based on the following two fundamental considerations. The first is that the vector sum of the ampere-turns of the two secondary windings of each of the current transformers is equal to the ampere-turns of its primary winding. (The primary ampere-turns are equal to the current in conductor 2 or 3, as the case may be, if the current transformers are of the conventional type having but a single primary turn.) This, of course, does not take into account the ampere-turns represented by the losses and magnetizing current of the transformers but these are usually very small and in comparison with the normal load currents are negligible. The second consideration is that the current in each of the primed secondary windings is the same and the current in each of the double primed secondary windings is the same. This follows from the fact that the primed secondary windings are connected in series with each other and the double primed secondary windings are connected in series with each other.

The only way that these two conditions can be satisfied simultaneously is for the magnitude of the ampere-turns of the primed and double primed secondary windings to be in the ratio of 0.866 to 0.5 and to have a quadrature phase relation such that the ampere-turns of the primed windings make a 30 degree angle with the primary ampere-turns and the ampere-turns of the double primed windings make an angle of 60 degrees of the primary ampere-turns. Under these conditions the vectors representing the ampere-turns of the primed and double primed secondary windings will combine vectorily so as to equal the ampere-turns of the primary windings. These vector relations are shown in Fig. 6.

However, the turns N' of the primed secondary windings are equal to $$\sqrt{3}$$

times the turns N'' of the double primed secondary windings. Consequently, the current in the circuits containing the primed and double primed secondary windings will be equal in magnitude although in quadrature with respect to their phase angle relation.

Their equality in magnitude can be proved as follows: The statement that the ratio of the ampere-turns of the primed windings to the double primed windings is equal to 0.866:0.5 may be expressed symbolically as follows:

$$\frac{I'N'}{I''N''} = \frac{0.866}{0.5}$$

where I' and N' are the current and number of turns respectively of the primed windings and I'' and N'' are the current and number of turns respectively of the double primed windings. This equation may readily be rewritten $$I'N' = \sqrt{3} I''N''$$

However, $$N' = \sqrt{3} N''$$

and substituting the $$\sqrt{3}N''$$

for N' in the second equation reduces this equation to $I' = I''$.

The quadrature phase relation between the primed and double primed currents is shown in Fig. 7. As the number of turns of the windings are not vector quantities it is the currents in the windings which give the ampere turns their vector characteristics and consequently the currents in the windings have the same vector directions as the ampere turns of the windings carrying these currents. The currents $I_{13''}$ and $I_{14''}$ obviously must be equal as they flow in the same series circuit. These currents also equal $I_{11}$, the current producing the resistance compensation and as shown this current is in line with the voltage to neutral of conductor 1. The currents $I_{13'}$ and $I_{14'}$ are in opposite directions and in quadrature with the double primed currents but as the winding 14' is reversed $I_{13'} = -I_{14'}$ and also equals $I_{12}$, the current in the resistor 12 which produces the reactance compensation.

In both Figs. 1 and 4 described above, the line to neutral voltage of one of the conductors was used to energize the regulating relay 8. In many cases, however, it would be very desirable to utilize the line-to-line voltage for energizing the regulating relay 8 in which case a somewhat simplified line drop compensator may be used in that one of the current transformers may be of the conventional single secondary winding type as will be described hereinafter. Accordingly, in Fig. 8 there is diagrammatically illustrated a line drop compensator used in connection with a voltage regulator where the regulating relay is energized in proportion to the line-to-line voltage. The corresponding parts of Fig. 8 are designated by the same reference numerals as in Figs. 1 and 4. In the case of Fig. 8, however, the direction of operation of the motor 7 is controlled by a voltage regulating relay 8 energized in proportion to the line-to-line voltage between conductors 1 and 3 by means of a potential transformer 18. The operating current for motor 7 may also conveniently be obtained from the secondary winding of potential transformer 18.

As in Fig. 1 the arrangement is such that if the energizing voltage of the relay 8 departs from a predetermined normal value in either direction, one or the other of the sets of contacts of the relay 8 will close thereby causing the motor 7 to drive the regulator 4 in the proper direction to restore the voltage to normal. When normal voltage is re-established the relay 8 opens its contacts and the motor comes to rest.

The line drop compensator 10 in the case of Fig. 8 comprises resistors 11 and 12 connected in series with relay 8 and current transformers 13 and 14 connected in the main conductors 2 and 3 just as illustrated in Figs. 1 and 4. The current transformer 13 has its primary winding connected in series with conductor 2 while the current transformer 14 has its primary winding connected in series with conductor 3. Current transformer 13 is the conventional type of current transformer having a single secondary winding 13' while current transformer 14 is provided with a pair of secondary windings 14' and 14'' similar to the current transformers described in connection with Figs. 1 and 4. The ratio of turns of the respective secondary windings of current transformer 14 are $$\sqrt{3}:1$$

that is, the ratio of turns of the double primed winding to the primed winding is $$\sqrt{3}:1$$

The single secondary winding 13' of current transformer 13 is provided with twice the number of turns that are wound on secondary winding 14' of current transformer 14. Secondary winding 14' with its polarity reversed is connected in series with secondary winding 13' across adjustable portions of resistor 12. A reversing switch 15 is provided for reversing the polarity of the resultant current output of secondary windings 13' and 14' as applied to the resistor 12. The secondary winding 14'' is connected across adjustable portions of resistor 11.

The operation of the line drop compensator illustrated in Fig. 8 can best be understood by reference to Figs. 9, 10, and 11. This operation is based on the fundamental consideration enunciated above that the vector sum of the ampere-turns of the secondary windings of current transformers must equal the ampere-turns of the respective primary windings. Since the current transformers are preferably of the type having a single turn primary winding the ampere-turns of the respective primary windings will be equal to the current flowing in conductors 2 and 3, neglecting of course the losses and magnetizing currents of the transformers which are usually very small relative to the normal load currents. In Fig. 9 the three vectors $I_1$, $I_2$, and $I_3$ may be the currents in conductors 1, 2, and 3 and also the voltages to neutral of the three main conductors at unity power-factor of the main circuit. $V_{1-3}$ is the line-to-line voltage between conductors 1 and 3 which is impressed across the primary of potential transformer 18. It is observed from Fig. 9 that the current $I_2$ is in quadrature with the voltage $V_{1-3}$ so that it is only necessary to obtain a current component in phase or in phase opposition with the voltage $V_{1-3}$ to have current components of the proper phase for the resistance elements 11 and 12 of the line drop compensator.

In Fig. 10 the currents $I_2$ and $I_3$ are illustrated by vectors and since the primary windings of the current transformers have only a single turn these vectors also may be the ampere turns of the primary windings of the current transformers 13 and 14. Since the ampere-turns of the secondary 13' of the current transformer 13 must equal the ampere-turns of the primary the vector $I_{13}'$ is illustrated in Fig. 10 as in phase with $I_2$. It is assumed for purposes of explanation only that the ratio of secondary to primary turns of transformer 13 is 2:1 so that $I_{13}' = I_2/2$. Since secondary winding 14' of current transformer 14 is in series with secondary winding 13' of current transformer 13, with reversed polarity, the current flowing in winding 14' must be equal and opposite to the current flowing in secondary winding 13' and is illustrated by the vector $I_{14}'$ in Fig. 10. Now since the ampere-turns of the secondary windings 14' and 14" must vectorially add up to the ampere-turns of the primary windings of current transformer 14 which are represented by $I_3$ in Fig. 10, and since the ratio of the turns 14" and 14' are in the ratio of $$\sqrt{3}:1$$

the ampere turns of winding 14" must be a vector quantity of the magnitude and phase position illustrated in Fig. 10. This result is based on the fact that the vectorial sum of the ampere-turns of the secondary windings 14' and 14" must equal $I_3$ which equals the primary ampere-turns for a single coil primary as is conventional in current transformers. It is observed, therefore, that the ampere turns in secondary winding 14" are in phase with the voltage $V_{1-3}$ and since the turn ratio of the secondary 14" to the primary is $$\sqrt{3}:1$$

$I_{14''}$ is equal to $I_{13'}$ and in quadrature therewith. This may be proven as follows, assuming a one turn primary winding on the current transformer:

$$I_{12} = I_{13}' = \frac{I_2}{N_{13}'}; \quad I_{11} = I_{14}'' = \frac{I_3 \frac{\sqrt{3}}{2}}{N_{14}''}$$

But $$I_3 = I_2 \text{ and } \frac{N_{14}''}{N_{13}'} = \frac{\sqrt{3}}{2}$$

Then $$I_{11} = \frac{I_2 \frac{\sqrt{3}}{2}}{N_{13}' \frac{\sqrt{3}}{2}} = \frac{I_2}{N_{13}'} = I_{12}$$

Therefore the currents $I_{11}$ and $I_{12}$ are numerically equal by reason of the different number of turns in the secondary windings 13', 14', and 14" of current transformers 13 and 14, respectively.

By adjusting the amount of the resistance 12 through which $I_{12}$ is passed the magnitude of the reactance compensation may readily be adjusted while by adjusting the amount of the resistance 11 through which current $I_{11}$ is passed the magnitude of the resistance compensation may readily be adjusted.

In each of Figs. 1, 4, and 8 the phase of the currents $I_{11}$ and $I_{12}$ is fixed by the main line current and is independent of the impedance through which these currents are passed. Consequently, it is not essential to this invention that the currents $I_{11}$ and $I_{12}$ be passed through resistors. For example, as shown in Fig. 12, resistors 11 and 12 may be replaced by adjustable reactors 19 and 20, or as shown in Fig. 13, they may be replaced by adjustable capacitors 21 and 22. However, in such cases the in-phase current $I_{11}$ will produce the reactance compensation voltage and the quadrature current $I_{12}$ will produce the resistance compensation voltage because the voltage drop in a reactance is always displaced 90 degrees from the current producing it.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What we claim as new and desire to secure by Letters Patent in the United States is:

1. In a line drop compensator for a voltage regulator for a three-phase circuit, a pair of similar type impedance elements serially connected in a circuit for measuring the voltage to neutral of one of the conductors of said circuit, means energized by the currents in the other two conductors of said three-phase circuit for passing through one of said impedances a current which is in phase with said voltage, and means energized by the currents in said other two conductors for passing through the other of said impedances a current which is in quadrature with said voltage.

2. In a line drop compensator for a voltage regulator for a three-phase circuit, a pair of similar type impedance elements serially connected in a circuit which measures the voltage to neutral of one of the conductors of said three-phase circuit, current transforming means connected in each of the other two conductors of said circuit, each of said current transforming means having a pair of secondary windings, a circuit energized by one secondary winding of each of said current transforming means for passing a current through one of said impedances which is in phase with said voltage to neutral when the power factor of said three-phase circuit is unity, and a circuit energized by the remaining secondary winding on each of said current transforming means for passing through the other of said impedance elements a current which is in quadrature with said voltage to neutral when the power factor of said three-phase circuit is unity.

3. In a line drop compensator for a feeder voltage regulator for a three-phase circuit, a pair of rheostats, means for passing through one of said rheostats a current proportional to the vector sum of the currents in two of the main conductors of said main circuit, and means for passing through the other of said rheostats a current proportional to the vector difference between the currents in said two main conductors.

4. In a line drop compensator for controlling a transformer type automatic voltage regulator for a three-phase alternating current power circuit, a control circuit connected to be energized in proportion to the voltage to neutral of one of the main conductors of said power circuit, a pair of resistors serially connected in said control circuit, current transformers connected respectively in the other two main conductors of said power circuit, a circuit energized by said current transformers for passing through one of said resistors a current proportional to the vector difference between the currents in said other two main conductors, means for varying the magnitude of the voltage drop in said resistor so as to adjust the magnitude of the reactance compensation produced by said compensator, a circuit energized by said current transformers for passing through the other of said resistors a current proportional to the vector sum of the currents in said other two main conductors, and means for varying the magnitude of the voltage drop in said last-mentioned resistor so as to adjust the magnitude of the resistance compensation produced by said compensator.

5. In a line drop compensator for controlling a transformer type automatic voltage regulator for a three-phase alternating current power circuit, a control circuit connected to be energized in proportion to the voltage to neutral of one of the main conductors of said power circuit, a pair of identical rheostats serially connected in said control circuit, similar ratioed current transforming means connected respectively in the other two main conductors of said power circuit, the current transforming means in each main conductor having a pair of secondary windings whose current outputs are in the ratio of $$\sqrt{3}:1$$

a circuit containing the $$\sqrt{3}$$

valued secondary windings in series opposition for circulating a current in one of said rheostats, and a circuit containing the unity valued secondary windings in series for circulating a current in the other of said rheostats.

6. In a line drop compensator for a voltage regulator for a three-phase circuit, a pair of impedance elements serially connected in a circuit for measuring the voltage to neutral of one of the conductors of said three-phase circuit, a pair of current transformers connected respectively in the other two conductors of said three-phase circuit, each of said current transformers having a pair of secondary windings wound on the same iron core, a circuit containing a secondary winding of each of said current transformers in series therein connected across one of said impedance elements, and a second circuit containing the remaining secondary windings in series with the polarity of one of them reversed connected across the other of said impedance elements.

7. In a line drop compensator for a voltage regulator for a three-phase circuit, a pair of rheostats, a pair of similar current transformers connected respectively in two of the conductors of said three-phase circuit, each of said current transformers having a pair of secondary windings wound on the same core and having their respective number of turns in the ratio of $$\sqrt{3}:1$$

a circuit containing the secondary windings whose turns are proportional to 1 connected in series therein with the same polarity across one of said rheostats for producing a resistance compensation voltage drop therein, and a circuit containing the secondary windings whose turns are proportional to the $$\sqrt{3}$$

serially connected therein with the polarity of one of them reversed, said last-mentioned circuit being connected across the remaining rheostat so as to produce a reactance compensation voltage drop.

8. In combination a three-phase circuit and means for obtaining therefrom a pair of currents having a quadrature phase relation which is independent of the impedance characteristics of a load placed on said means comprising, a pair of current transformers connected respectively in two of the conductors of said circuit, each of said current transformers having a pair of secondary windings wound on the same iron core, a circuit containing a secondary winding of each of said current transformers serially connected therein with the same polarity for producing one of said quadrature-related currents, and a second circuit containing the remaining secondary windings of said current transformers serially connected therein with the polarity of one of them reversed for producing the other of said quadrature-related currents.

9. In a line drop compensator for a voltage regulator for a three phase circuit, a pair of similar type impedance elements serially connected in a circuit for measuring one voltage quantity of said three phase circuit, means energized by currents in a plurality of conductors of said three phase circuit for passing through one of said impedances a current which is in phase or in phase opposition with said voltage quantity, and means energized by currents in a plurality of conductors of said three phase circuit for passing through the other of said impedances a current which is in quadrature with said voltage quantity.

10. In combination, a three-phase circuit and means for obtaining a pair of currents having a quadrature phase relation which is independent of the impedance characteristics of a load placed on said means comprising a pair of current transformers connected respectively in two of the conductors of said circuit, one of said current transformers having a pair of secondary windings, a circuit containing a secondary winding of each of said current transformers serially connected therein with the polarity of one of them reversed for producing one of said quadrature related currents and a second circuit containing the remaining secondary winding for producing the other of said quadrature related currents.

11. In a line drop compensator for controlling a transformer type automatic voltage regulator for a three-phase alternating current power circuit, a control circuit connected to be energized in proportion to a voltage quantity of said power circuit, a pair of impedances serially connected in said control circuit, current transformers connected respectively in two of the main conductors of said power circuit, a circuit energized by said current transformers for passing through one of said impedances a current in phase or in phase opposition with said voltage quantity, means for varying the magnitude of the voltage drop in said impedance so as to adjust the magnitude of the resistance compensation produced by said compensator, a circuit energized by said current transformers for passing through the other of said impedances a current in quadrature with said voltage quantity, and means for varying the magnitude of the voltage drop in said last mentioned impedance so as to adjust the magnitude of the reactance compensation produced by said compensator.

12. In a line drop compensator for a feeder voltage regulator for a three-phase circuit, a pair of impedances, means for passing through one of said impedances a current in phase with and proportional to the current in one of the main conductors of said main circuit, and means for passing through the other of said impedances a current equal to and in quadrature with the current in said first mentioned impedance comprising means for vectorially adding currents proportional to the currents flowing in two of said main conductors of said main circuit.

THOMAS C. LENNOX.
SALVATORE MINNECI.